United States Patent [19]

Cairns

[11] Patent Number: 5,501,544
[45] Date of Patent: Mar. 26, 1996

[54] THREE-PIECE CLAMPING ASSEMBLY

[75] Inventor: James W. Cairns, West Chester, Pa.

[73] Assignee: Nolu Plastics, Inc., Aston, Pa.

[21] Appl. No.: 339,277

[22] Filed: Nov. 10, 1994

[51] Int. Cl.$^6$ ........................................... F16B 7/04
[52] U.S. Cl. ......................... 403/400; 403/385; 403/396; 248/231.61
[58] Field of Search ..................................... 403/400, 388, 403/389, 394, 384, 385, 403, 408.1, 373, 396, 397, 391, 24, 339; 182/179; 211/182; 248/231.6; 198/836.2, 836.4; 24/335, 339, 569; 256/69, 88

[56] References Cited

U.S. PATENT DOCUMENTS

| | | |
|---|---|---|
| 1,631,831 | 6/1927 | Palmer-Jones . |
| 1,950,635 | 6/1930 | Steinmayer . |
| 2,733,035 | 1/1956 | Rocheleau . |
| 2,767,003 | 10/1956 | Gilmont ................................ 403/385 |
| 2,942,899 | 6/1960 | Rifken . |
| 3,025,089 | 3/1962 | Ramsden . |
| 3,096,110 | 7/1963 | Cantor . |
| 3,677,584 | 7/1972 | Snort . |
| 4,784,514 | 11/1988 | Paniev . |
| 5,335,782 | 8/1994 | Herzog ................................ 198/836.3 |

FOREIGN PATENT DOCUMENTS

| | | | |
|---|---|---|---|
| 1261347 | 4/1961 | France .................................. 403/400 |
| 1434883 | 2/1966 | France .................................. 403/400 |
| 3244753 | 6/1984 | Germany .............................. 403/385 |
| 427505 | 11/1947 | Italy ...................................... 403/385 |
| 2227053 | 7/1990 | United Kingdom ................... 403/400 |

Primary Examiner—Kenneth J. Dorner
Assistant Examiner—Harry C. Kim
Attorney, Agent, or Firm—Cushman Darby & Cushman

[57] ABSTRACT

A clamping assembly including a first end member having a recess defined in an end surface thereof and a bore between opposing end surfaces thereof. An intermediate member has a recess in each end surface thereof and a bore between the first and second end surfaces thereof. A second end member has first and second end surfaces and a recess defined in one of the end surfaces thereof, and a threaded bore between the first and second end surfaces. The intermediate member is disposed between the first and second end members such that the threaded bore aligns with the bore of the intermediate member and the bore of the first end member. One recess of the intermediate member cooperates with the recess of the first end member to define a first pin bore through the clamping assembly. The other recess of the intermediate member cooperates with the recess of the second end member to define a second pin bore through the clamping assembly disposed generally transverse to the first pin bore. A threaded rod is disposed through the bore of the intermediate member and the bore of the first end member and is in threaded engagement with the threads defined in the bore of the second end member at one end thereof. A control knob is engaged to the threaded rod at the other end thereof such that once the control knob is moved to further engage the threaded rod with the screw threads of the bore, surfaces defining the first and second pin bores frictionally engage and clamp an associated pins therein.

10 Claims, 2 Drawing Sheets

THREE-PIECE CLAMPING ASSEMBLY

BACKGROUND OF THE INVENTION

The present invention relates to a clamping assembly, and, more particularly, to a clamping assembly for use in clamping guide rails to support structure of a conveyor system.

Conveyor systems are commonly employed for transporting containers during the filling, sealing and/or labelling process and typically include guide or side rails to guide and contain the containers as they move along a moveable track. Since the conveyor track may extend a significant distance, a plurality of clamping assemblies are provided to support and hold the guide rails at various locations along the track.

When a variety of products are to be processed with a single conveyor system, it is often necessary to adjust the position of the guide rails depending upon the size and type of product, whether it is a container or some other component. Thus, it may be necessary to move the guide rails toward or away from the center of the track or upwardly or downwardly with respect to the track so as to insure that the products are guided adequately by the guide rails.

In adjusting the guide rails, each clamping assembly must be individually manually adjusted to accommodate the particular product being processed. Typical clamping assemblies include a bracket bolted to the conveyor support structure, a first pin extending vertically from the bracket, a clamping block frictionally engaged with the first pin and a second pin frictionally engaged with the clamping block and extending in a direction transverse to the first pin. A distal end of the second pin typically includes a clamp for receiving and holding one or more guide rails. The vertical position of the second pin and thus the guide rail, may be adjusted by moving the clamping block, together with the second pin, with respect to the first pin. The lateral position of the second pin and thus the guide rail, may be adjusted by moving the second pin with respect to the clamping block.

Certain conventional clamping assemblies require that each pin be independently adjusted, which is time consuming and may require the use of special tools. Other assemblies are adapted to simultaneously unlock the pins to facilitate the adjustments, but recently proposed structures of this type require a two-handed release which makes it difficult to maintain the assembly in a desired position during locking. For example, it is difficult to maintain the proper vertical and horizontal positions of the pins while clamping the pins to the clamping block; therefore, adjusting the guide rails for particular product containers with this type of assembly may be at times difficult and time consuming.

Another deficiency of many conventional clamping assemblies is that they have complicated configurations resulting in structural irregularities, including cavities and notches formed in surfaces thereof. Further, in certain assemblies, screw threads or other mechanical components may be exposed. As a result, dirt and debris can collect in the cavities, notches and the like, making the assembly difficult to clean. This in turn can create problems in meeting Food and Drug Administration (FDA) regulations.

SUMMARY OF THE INVENTION

An object of the present invention is to provide a clamping arrangement in which both the vertical and horizontal pins can be released with one hand while they are supported by the other hand and thereafter, can be adjusted easily.

Another object of the invention is to provide a clamping arrangement having a smoothly contoured, generally continuous peripheral surface with minimal exposed cavities, notches and the like, whereby the collection of dirt and debris is minimized and the structure can be easily cleaned so as to minimize any potential FDA problems.

In accordance with the principles of the present invention, these objectives are obtained by providing a clamping assembly including a generally cylindrical first end member having a recess defined in an end surface thereof. A generally cylindrical intermediate member has a recess in each end surface thereof and a generally cylindrical second end member has a recess defined in one of the end surfaces thereof. The intermediate member is disposed between the first and second end members such that one of the recesses of the intermediate member cooperates with the recess of the first end member to define a first pin bore through the clamping assembly. The other recess of the intermediate member cooperates with the recess of the second end member to define a second pin bore through the clamping assembly, disposed generally transverse with respect to the first pin bore. The first and second pin bores are constructed and arranged to receive pins therein.

The first end member, the intermediate member and the second end member may be clamped together in such a manner so as to frictionally engage and hold the pins in the pin bores. Further, the clamping disposition of the members can be released with one hand so as to permit support of the assembly with the other hand during release and during adjustment of the pins to maintain control of the assembly. The clamped first end member, intermediate member and second end member define a smoothly contoured, generally continuous outer peripheral surface which may be cleaned easily.

Another object of the present invention is the provision of a clamping assembly of the type described, which is simple in construction, effective in operation and economical to manufacture and maintain.

Other objects, features and characteristics of the present invention, as well as the methods of operation and functions of the related elements of the structure, the combination of the parts and the economies of manufacture will become more apparent upon consideration of the following detailed description and appended claims with reference to the accompanying drawings, all of which form a part of the specification.

3

Figure 9:
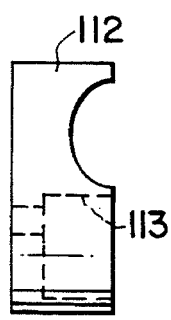
Figure 10:
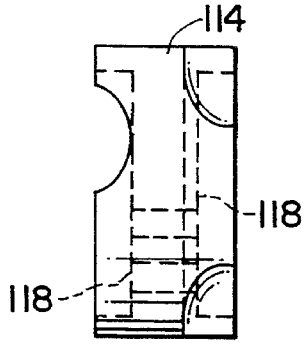

FIG. 9 is a side view of a molded, first end member provided in accordance with the invention;

FIG. 10 is a side view of a molded, intermediate member of the invention; and

Figure 11:
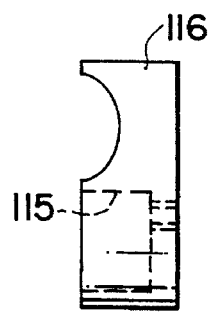

FIG. 11 is a side view of a molded, second end member of the invention.

DETAILED DESCRIPTION OF THE PRESENTLY PREFERRED EXEMPLARY EMBODIMENTS

Figure 1:
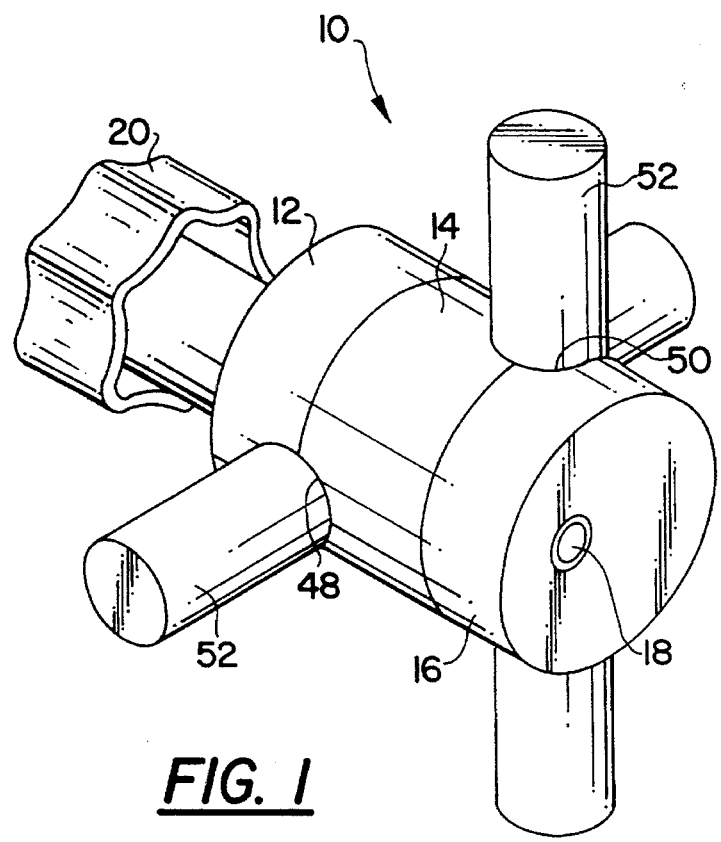
FIG. 1 is a perspective view of a three-piece clamping assembly provided in accordance with the principles of the present invention, shown with portions of pins clamped therein.

With reference to FIG. 1, a three-piece clamping assembly, generally indicated at 10, is shown. The clamping assembly 10 includes a first end member 12, an intermediate member 14, and a second end member 16. The clamping assembly 10 further includes a threaded rod 18 extending through the first end member 12, intermediate member 14 and the second end member 16. A control knob 20 is coupled to one end of the threaded rod 18 for rotating the threaded rod 18.

Figure 3:
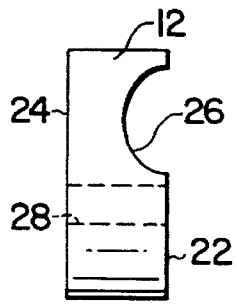
FIG. 3 is a side view of a first end member of the clamping assembly.
Figure 4:
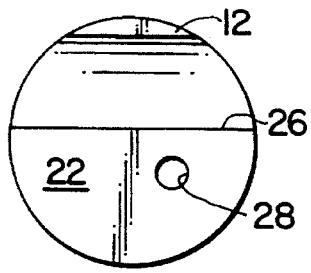
FIG. 4 is a view of the first end member of FIG. 3 as seen from above.

With reference to FIGS. 3 and 4, the first end member 12 is of generally cylindrical configuration having a diameter of approximately 1.30 inches and a thickness in the axial direction of approximately 0.50 inches. The first end member 12 includes first and second end surfaces 22 and 24, respectively. A recess 26 is defined in the first end surface 22 thereof. As shown in FIG. 4, a bore 28 is defined in a lower quadrant of the first end member 12 between surfaces 22 and 24.

Figure 5:
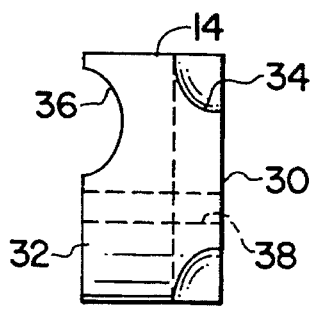
FIG. 5 is a side view of an intermediate member of the clamping assembly.
Figure 6:
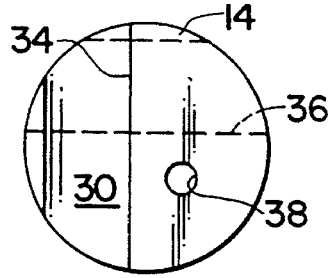
FIG. 6 is a view of the intermediate member of FIG. 5 as seen from above.

As shown in FIGS. 5 and 6, the intermediate member 14 is also of generally cylindrical configuration having a diameter generally equal to the diameter of the first end member 12 and has a thickness of approximately 0.75 inches. The intermediate member 14 has first and second end surfaces 30 and 32, respectively. A recess 34 is defined in surface 30 and a recess 36 is defined in surface 32. As shown in FIG. 6, the recesses 34 and 36 are oriented generally traversely with respect to each other. The intermediate member 14 further includes a bore 38 extending therethrough, between the first and second end surfaces 30, 32 in a lower quadrant thereof, as illustrated.

Figure 7:
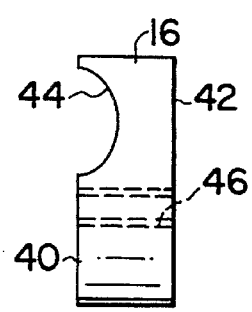
FIG. 7 is a side view of a second end member of the clamping assembly.
Figure 8:
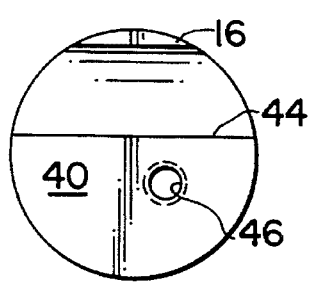
FIG. 8 is a view of the second end member of FIG. 7 as seen from above.

As shown in FIGS. 7 and 8, the second end member 16 is of generally cylindrical configuration having a diameter and a thickness generally equal to those of first end member 12. The second end member 16 has first and second end surfaces 40 and 42, respectively, and a recess 44 defined in the first end surface 40 thereof. A threaded bore 46 is defined between the first and second end surfaces 40, 42 of the second end member 16 in a lower quadrant thereof, as illustrated. It can be appreciated that bore 46 need not extend through the second end member, but may extend at least part-way from the first end surface toward the second end surface. Further, the bore 46 need not be threaded along its entire length, so long as at least a part of the bore defines screw threads. Alternatively, a threaded insert, preferably of metal, may be disposed in the bore 46 defining internal threads thereof.

Figure 2:
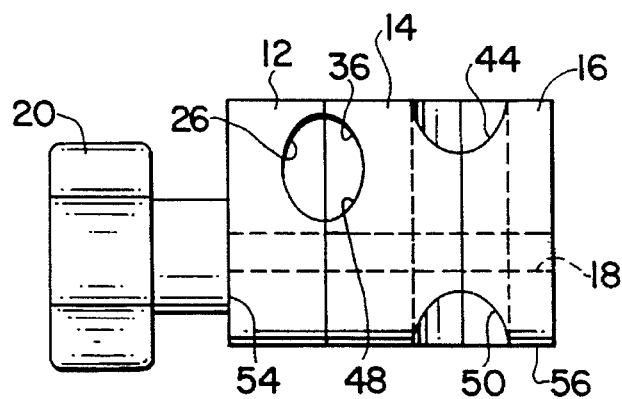
FIG. 2 is side view of the clamping assembly of FIG. 1, shown with the pins removed for clarity of illustration.

As shown in FIGS. 1 and 2, the intermediate member 14 is disposed between the first and second end members 12, 16 such that threaded bore 46 aligns with bore 38 of the intermediate member 14 and the bore 28 of the second end member 12 to define an axially extending bore. Further, recess 36 of the intermediate member cooperates with recess 26 of the first end member 12 to define a first pin bore 48 through the clamping assembly 10 and generally transverse to the axially extending bore. The other recess 34 of the intermediate member 14 cooperates with recess 44 of the second end member 16 to define a second pin bore 50 through the clamping assembly 10, disposed generally traverse with respect to the first pin bore 48 thereof and generally transverse to the axially extending bore. The pin bores 48 and 50 are constructed and arranged to receive respective pins 52.

The threaded rod 18 is disposed respectively through bores 28 and 38 of the first end member 12 and the intermediate member 14 and is in threaded engagement with the screw threads of bore 46 of the second end member 16 at one end thereof. The rod 18 is thus disposed generally transversely with respect to the pin bores 48 and 50. In the illustrated embodiment, the rod 18 is threaded along its entire length, however, only the ends thereof need be threaded. The control knob 20 is engaged to the threaded rod 18 at the other end thereof. The control knob 20 includes a stop surface 54 which is constructed and arranged to engage the second end surface 24 of the first end member 12.

As shown in FIG. 2, when the control knob 20 is moved such that the stop surface 54 thereof engages the second surface 24 of the first end member 12, surfaces defining the first and second pin bores 48 and 50 engage and clamp associated pins 52 therein. In the illustrated embodiment, each recess 26, 34, 36 and 44 is semi-circular in section defined by a radius of approximately 0.252 inches to accommodate conventional pins.

As shown in FIG. 1, the first end member 12, the intermediate member 14 and the second end member 16 cooperate to define a smoothly contoured and generally continuous outer peripheral surface 56. Further, the entire threaded area of the threaded rod 18 is disposed within the threaded bore 46 and the bores 38 and 28 of the intermediate member 14 and first end member 12. Thus, the threaded rod 18 is constructed and arranged with respect to the first end member 12, the second end member 16, the intermediate member 14 and the control knob 20 such that when the clamping assembly 10 is clamping the pins, threads of the threaded rod 18 are not exposed to the environment.

Although in the illustrated embodiment the first end member, the second end member and the intermediate member each have generally equal diameters, it is within the contemplation of the invention to provide members of varying size. For example, the intermediate member may have a diameter greater than the diameter of the end members. Even so, when assembled, the first end member, the second end member and the intermediate member should desirably cooperate to define a smoothly contoured, generally continuous outer periphery. Such a smooth contour can be provided, for example by providing for a smooth transition between members of different sizes. Accordingly, it can be appreciated that the smoothly contoured clamping assembly 10 of the invention minimizes cavities, notches, threads or other places where dirt may collect and is therefore easy to clean, reducing the likelihood of potential FDA problems.

The first end member 12, the second end member 16 and the intermediate member 14 may be machined or molded. Machined members may be made from polyester, polyvinylchloride (PVC) or the like. However, it is preferable to mold these members from Acetal, reinforced nylon or other suitable moldable materials, to reduce manufacturing cost. Thus, with reference to FIGS. 9–11, exemplary molded first and second end and intermediate members of the clamping assembly are shown. The first end member 112 includes an internal cavity 113, the second end member 116 includes an internal cavity 115. The intermediate member 114 has a diameter slightly larger than that of the end members 112, 116. Opposing counter-bores 118 are provided in intermediate member 114 for receiving an associated end member therein. The cavities and counter-bores are provided to ensure proper molding, without shrinkage. In all other aspects, members 112, 114 and 116 are generally similar to members 12, 14 and 16, respectively, of the structure illustrated in FIGS. 1–8.

With reference to FIG. 1, the operation of the three-piece clamping assembly 10 will be appreciated. To assemble the clamping assembly 10 with respect to generally transverse pins 52, the control knob 20 is loosened to reduce the threaded engagement of the threaded rod 18 with the threaded bore 46 of the second end member 16. Next, the pins 52 are inserted through the pin bores 48 and 50 defined in the clamping assembly 10. While the clamping assembly 10 is held with one hand, the assembly can be adjusted such that the proper orientation of the pins 52 and thus, the guide rails is achieved for the particular product being conveyed. The control knob 20 is then tightened with the operator's other hand so as to clamp the pins 52 between the cooperating surfaces defining the first and second pin bores 48 and 50. The pins 52 are thus fictionally held or clamped in a desired position by the clamping assembly 10.

With reference to FIG. 1, it can be appreciated that the clamping assembly 10 may be oriented such that a vertical pin is coupled to a bracket (not shown) fixed to a support surface of the conveyor system (not shown) while a horizontal pin is coupled to one or more guide rails of the conveyor system. Thus, when it is desired to change the location of the guide rails quickly due to a change in the product to be processed, the control knob 20 is simply loosened while the cylindrical portion 56 of the clamping assembly 10 is held with one hand. Horizontal and vertical adjustments can then be made to orient the guide rail in the desired position to accommodate the new product container to be processed. While holding the assembly 10 in its proper position with one hand, the control knob 20 is then tightened with the other hand to secure the pins 52 with respect to the clamping assembly 10.

The three-piece clamping assembly of the invention provides a simple and effective way of manually adjusting relative positions of guide rails or similar devices quickly and easily. Further, the smoothly contoured and generally continuous outer peripheral surface of the clamping assembly minimizes cavities and places where dirt may accumulate, therefore the assembly may be cleaned easily.

While the invention has been described in connection with what is presently considered to be the most practical and preferred embodiment, it is understood that the invention is not limited to the disclosed embodiment, but, on the contrary, is intended to cover various modifications and equivalent arrangements included with the spirit and scope of the appended claims.

What is claimed is:

1. A clamping assembly comprising:
   a generally cylindrical first end member having first and second end surfaces and a recess defined in said first end surface, said first end member having a bore defined therethrough,
   a generally cylindrical intermediate member having a first and second end surfaces and a recess in each of said end surfaces thereof, said intermediate member having a bore defined therethrough,
   a generally cylindrical second end member having first and second end surfaces and a recess defined in one of said end surfaces thereof, a bore extending at least part-way from said first end surface toward said second end surface, at least part of said bore defining screw threads,
   said intermediate member being disposed between said first and second end members such that said bore of said intermediate member and said bore of said first end member align with said bore of said second end member to define an axially extending bore, and one of said recesses of said intermediate member cooperating with said recess of said first end member to define a first pin bore that extends through the clamping assembly, generally transverse to said axially extending bore, the other recess of said intermediate member cooperating with said recess of said second end member to define a second pin bore through the clamping assembly, generally transverse to said axially extending bore and generally transverse to said first pin bore, said first and second pin bores being constructed and arranged to receive associated pins therein,
   a rod having first and second ends and having screw threads defined along at least a portion of a length thereof, said rod being disposed through said bore of said intermediate member and said bore of said first end member, said threads being engaged with said screw threads of said bore of said second end member at said second end thereof, and
   a control knob provided on said first end of said rod, said control knob including a stop surface which is constructed and arranged to engage said second end surface of said first end member,
   wherein, once said control knob is moved such that the rod further engages the screw threads of the bore of said second end member and said stop surface engages said second end surface of said first end member, surfaces defining said first and second pin bores are constructed and arranged to frictionally engage and clamp said associated pins therein with the pins free from direct locking engagement with the rod, and said first end member, said intermediate member and said second end member cooperate to define a smoothly contoured, generally continuous outer peripheral surface.

2. The clamping assembly according to claim 1, wherein each of said first end member, said intermediate member and said second end member have generally equal diameters.

3. The clamping assembly according to claim 2, wherein each of said first end member, said intermediate member and said second end member have said diameters of approximately 1.30 inches.

4. The clamping assembly according to claim 1, wherein said first end member, said second end member and said intermediate member are made from Acetal.

5. The clamping assembly according to claim 1, wherein said first end member, said second end member and said intermediate member are made from reinforced nylon.

6. The clamping assembly according to claim 1, wherein said first end member, said second end member and said intermediate member are made from polyester.

7. The clamping assembly according to claim 1, wherein said first end member, said second end member and said intermediate member are made from polyvinylchloride.

8. The clamping assembly according to claim 1, wherein said first end member and said second end member each have axial thicknesses of approximately 0.50 inches and an axial thickness of said intermediate member is approximately 0.75 inches.

9. The clamping assembly according to claim 1, wherein each said recess is generally semi-circular in section defined by a radius of approximately 0.252 inches.

10. The clamping assembly according to claim 1, wherein said rod is constructed and arranged with respect to said first end member, said second end member, said intermediate member and said control knob such that when said clamping assembly is in a clamping position, said screw threads of said rod are not exposed to the environment.

* * * * *